(12) United States Patent
Minamikawa (10) Patent No.: US 10,471,694 B2
(45) Date of Patent: Nov. 12, 2019

(54) LAMINATE, METHOD FOR PRODUCING LAMINATE, AND PERSONAL AUTHENTICATION MEDIUM

(71) Applicant: TOPPAN PRINTING CO., LTD., Taito-ku, Tokyo (JP)

(72) Inventor: Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/045,162

(22) Filed: Jul. 25, 2018

(65) Prior Publication Data
US 2018/0326710 A1 Nov. 15, 2018

Related U.S. Application Data

(63) Continuation of application No. PCT/JP2017/002735, filed on Jan. 26, 2017.

(30) Foreign Application Priority Data

Jan. 27, 2016 (JP) ................. 2016-013298

(51) Int. Cl.
*B32B 37/18* (2006.01)
*B32B 27/36* (2006.01)
(Continued)

(52) U.S. Cl.
CPC ............ *B32B 37/182* (2013.01); *B32B 27/36* (2013.01); *B32B 37/04* (2013.01); *B42D 25/23* (2014.10);
(Continued)

(58) Field of Classification Search
CPC ....... B32B 37/182; B32B 37/04; B32B 27/36; B32B 27/365; B32B 2305/347;
(Continued)

(56) References Cited

U.S. PATENT DOCUMENTS

2007/0211317 A1* 9/2007 Heim ................ B42D 25/29
359/2
2009/0081389 A1* 3/2009 Ishida ................ B41M 7/0027
428/29
(Continued)

FOREIGN PATENT DOCUMENTS

CN 102472848 A 5/2012
DE 102008049631 A1 4/2010
(Continued)

OTHER PUBLICATIONS

International Preliminary Report on Patentability dated Jul. 31, 2018 in International Patent Application No. PCT/JP2017/002735, 5 pages.
(Continued)

*Primary Examiner* — Seung H Lee
(74) *Attorney, Agent, or Firm* — Squire Patton Boggs (US) LLP (57) ABSTRACT

A transparent reflection layer is a visible light refractive index of greater than or equal to 2.0. In a plan view of a plane, the transparent reflection layer is located in a part of the transfer layer. At least a part of the transparent reflection layer is located inside an outline of the transfer layer. A portion of the transfer layer that is nil of the transparent reflection layer is a visible light refractive index of between 1.4 and 1.8 inclusive. The polycarbonate layer encloses the transfer layer. A cross section in a thickness direction of the laminate includes a first cross section that is nil of the transfer layer, a second cross section including the portion of the transfer layer that is nil of the transparent reflection layer, and a third cross section including a portion of the transfer layer that includes the transparent reflection layer.

11 Claims, 8 Drawing Sheets

(51) Int. Cl.
*B42D 25/23* (2014.01)
*B42D 25/328* (2014.01)
*B42D 25/455* (2014.01)
*B42D 25/46* (2014.01)
*B42D 25/47* (2014.01)
*B32B 37/04* (2006.01)
*B42D 25/41* (2014.01)
*B42D 25/36* (2014.01)
*B42D 25/324* (2014.01)
*B42D 25/351* (2014.01)
*B32B 37/02* (2006.01)
*B44C 1/17* (2006.01)

(52) U.S. Cl.
CPC ......... *B42D 25/324* (2014.10); *B42D 25/328* (2014.10); *B42D 25/351* (2014.10); *B42D 25/36* (2014.10); *B42D 25/41* (2014.10); *B42D 25/455* (2014.10); *B42D 25/46* (2014.10); *B42D 25/47* (2014.10); *B32B 27/365* (2013.01); *B32B 37/02* (2013.01); *B32B 2305/347* (2013.01); *B32B 2425/00* (2013.01); *B32B 2429/00* (2013.01); *B44C 1/1729* (2013.01)

(58) Field of Classification Search
CPC . B32B 2425/00; B32B 2429/00; B32B 37/02; B42D 25/455; B42D 25/46; B42D 25/47; B42D 25/24; B42D 25/328; B42D 25/23; B42D 25/40; B44C 1/1729
See application file for complete search history.

(56) References Cited

U.S. PATENT DOCUMENTS

| | | |
|---|---|---|
| 2011/0174884 A1 | 7/2011 | Endres et al. |
| 2012/0127547 A1 | 5/2012 | Gocho et al. |
| 2015/0036198 A1 | 2/2015 | Inokuchi |
| 2017/0100956 A1 | 4/2017 | Gocho et al. |
| 2017/0267013 A1* | 9/2017 | Staub ................... B41M 3/148 |

FOREIGN PATENT DOCUMENTS

| | | | |
|---|---|---|---|
| JP | 2012013964 A | * | 1/2012 |
| JP | 4925543 B2 | | 4/2012 |

OTHER PUBLICATIONS

First Office Action dated Aug. 29, 2019, in Chinese Patent Application No. 201780008339.8, 15 pages.
EPO Communication dated Jun. 25, 2019 forwarding extended European Search Report for European Patent Application No. 17744319.9, 7 pages.

* cited by examiner

LAMINATE, METHOD FOR PRODUCING LAMINATE, AND PERSONAL AUTHENTICATION MEDIUM

BACKGROUND

A embodiment of the present invention relates to a laminate that encloses a transfer layer and includes polycarbonate, a method for manufacturing the laminate, and an identification medium including the laminate, in particular, an identification medium such as a card or a passport.

A laminated material, or a laminate, of an identification medium, such as a card or a passport, that encloses a transfer layer is highly resistive against chemical agents, wear, and tampering and is difficult to remove by unauthorized means, as compared with other structures in which the transfer layer is located on the surface of the medium.

Conventionally, a method for manufacturing a laminated material enclosing a transfer layer includes the following manufacturing steps. First, a transfer layer is affixed to a first sheet through a transfer process typically using thermal pressure. Then, a second sheet is directly affixed to the first sheet so that the second sheet is fused to the first sheet. Alternatively, the second sheet is affixed to the first sheet through an adhesion layer so that the second sheet is bonded to the first sheet.

The manufacturing steps described above have a number of problems. To fuse the second sheet to the first sheet, a temperature and a pressure that are higher than those used in the transfer of a transfer layer are typically applied for a long time.

This lengthy application of a high temperature and pressure during the lamination process may damage or deform the enclosed transfer layer to an extent that impairs the function of the transfer layer. To avoid this problem, the enclosed transfer layer needs to be made of a material that has a high melting point or rigidity so as not to be damaged by the temperature and pressure generated in the lamination process.

However, when the material of the transfer layer has a melting point or rigidity that is high enough to resist the thermal pressure in the lamination process, a problem occurs when affixing the transfer layer to the first sheet. That is, the high melting point or rigidity of the material may result in transfer burrs and chipping in the transfer process to the first sheet, hindering the transfer of the expected shape. The transfer burr is a section extending outward of the outline of the expected shape, and the chipping is a section extending inward of the outline of the expected shape.

This problem is particularly pronounced in the lamination process when the materials of the first and second sheets are polycarbonate materials having a higher melting point than the PVC material or amorphous copolyester material. The temperature required to laminate the polycarbonate materials having high melting points is between 170° C. and 200° C., and the lamination requires a time period of about 1 to 30 minutes.

To minimize damage to the transfer layer in the lamination process, Japanese Patent No. 4925543 proposes a method in which a transfer layer is divided into dots or lines of less than or equal to 5 mm and placed on a sheet.

However, dividing a transfer layer into minute portions and arranging them as described in Japanese Patent No. 4925543 is extremely difficult. The smaller and the more complex the shape of the transfer layer to be transferred, the more frequent the generation of transfer burrs and chipping becomes. To minimize transfer burrs and chipping, the material of the transfer layer needs to be brittle and easy to break. However, the transfer layer having such a material tends to break in the lamination process, increasing the possibility that the enclosed transfer layer is damaged or deformed to an extent that impairs the function of the transfer layer.

SUMMARY

As described above, for a laminate enclosing a transfer layer and including polycarbonate, it is extremely difficult to provide the transfer layer with a high transfer quality to the polycarbonate sheet and a sufficient resistance against the high temperature and pressure in the lamination process.

It is an objective of the present disclosure to solve the problems described above.

In accordance with a first aspect, a method for manufacturing a laminate, the method is provided that includes: transferring a transfer layer onto a first polycarbonate layer, wherein the transfer layer includes a plurality of layers including a transparent reflection layer, the transparent reflection layer is a visible light refractive index of greater than or equal to 2.0, and in a plan view of a plane in which the transfer layer extends, the transparent reflection layer is located in a part of the transfer layer and at least a part of the transparent reflection layer is located inside an outline of the transfer layer, and a portion of the transfer layer that is nil of the transparent reflection layer is a visible light refractive index of between 1.4 and 1.8 inclusive; and laminating the first polycarbonate layer and a second polycarbonate layer with the transfer layer together such that the transfer layer is held between and enclosed by the first and second polycarbonate layers.

In accordance with a second aspect, a laminate is provided that includes a transfer layer and a polycarbonate layer. The transfer layer has a plurality of layers including a transparent reflection layer. The transparent reflection layer is a visible light refractive index of greater than or equal to 2.0. In a plan view of a plane in which the transfer layer extends, the transparent reflection layer is located in a part of the transfer layer. At least a part of the transparent reflection layer is located inside an outline of the transfer layer. A portion of the transfer layer that is nil of the transparent reflection layer is a visible light refractive index of between 1.4 and 1.8 inclusive. The polycarbonate layer encloses the transfer layer. A cross section in a thickness direction of the laminate includes a first cross section that is nil of the transfer layer, a second cross section including the portion of the transfer layer that is nil of the transparent reflection layer, and a third cross section including a portion of the transfer layer that includes the transparent reflection layer.

In accordance with a third aspect, the first cross section is preferably nonadjacent to the third cross section.

In accordance with a fourth aspect, in a plan view of the plane in which the transfer layer extends, a region having the third cross section preferably has a shape that represents at least one of a figure, a character, and a pattern.

In accordance with a fifth aspect, in a plan view of the plane in which the transfer layer extends, the region having the third cross section preferably has at least one of an acute angle and a right angle.

In accordance with a sixth aspect, the transfer layer preferably has a plurality of regions having the transparent reflection layer, and a minimum distance between at least two of the regions having the transparent reflection layer is preferably between 1 mm and 50 mm inclusive.

In accordance with a seventh aspect, in a plan view of the plane in which the transfer layer extends, a region having the third cross section preferably has a width of between 0.5 mm and 5 mm inclusive and a shape of at least one of a straight line, a curved line, and a dotted line.

In accordance with an eighth aspect, the transfer layer preferably includes an optical relief formation layer having an optical relief structure, and the transparent reflection layer is preferably in contact with at least a part of the optical relief structure.

In accordance with a ninth aspect, at least one of the layers of the transfer layer preferably includes a luminescent material having a maximum emission wavelength in a wavelength region that differs from a wavelength region of a peak wavelength of excitation light.

In accordance with a tenth aspect, in a plan view of the plane in which the transfer layer extends, the luminescent material is preferably located in a part of the transfer layer and the luminescent material has a shape that differs from a shape of the transparent reflection layer.

In accordance with an eleventh aspect. an identification medium that includes the above-described laminate is provided.

DESCRIPTION OF EXEMPLARY EMBODIMENTS

Various embodiments of the disclosure are described below with reference to the accompanying drawings. In the drawings, same reference numerals are given to those components that have the same or similar functions, and redundant descriptions are omitted.

[First Embodiment]

Figure 1A:
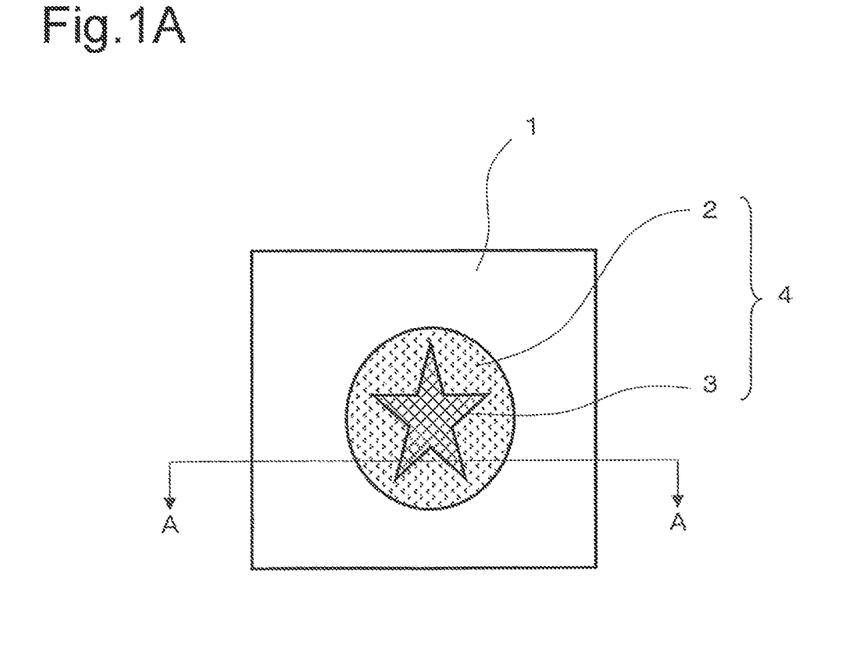
FIG. 1A is a plan view schematically showing the planar structure of a polycarbonate laminate of a first embodiment before the lamination process.
Figure 1B:
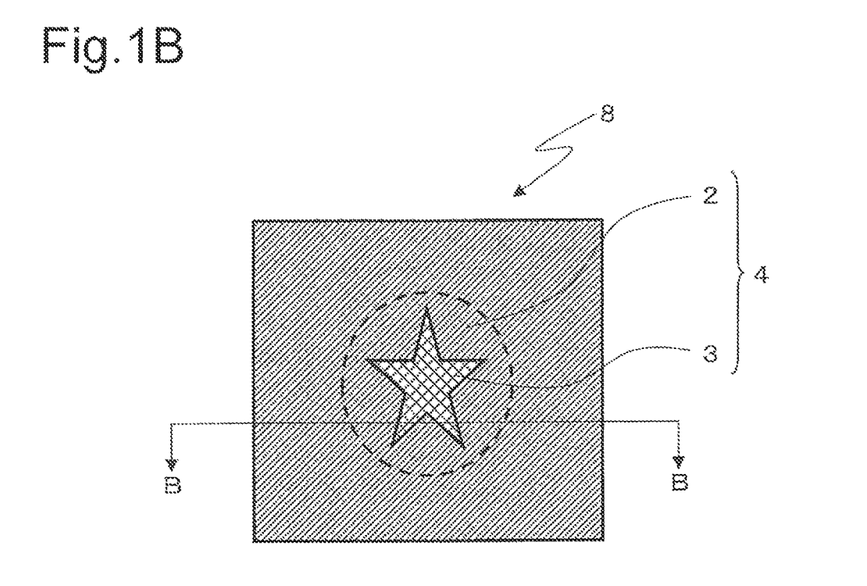
FIG. 1B is a plan view schematically showing the planar structure of a polycarbonate laminate of the first embodiment after the lamination process.
Figure 2A:
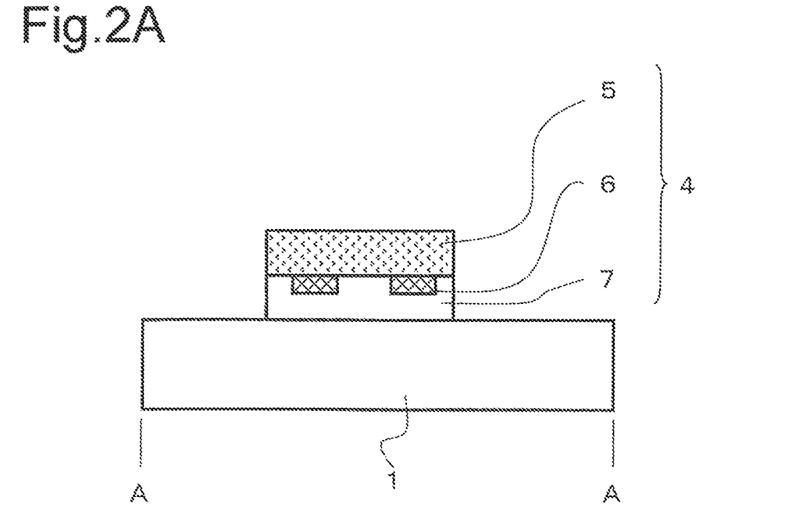
FIG. 2A is a cross-sectional view showing the cross-sectional structure taken along line A-A in FIG. 1A.
Figure 2B:
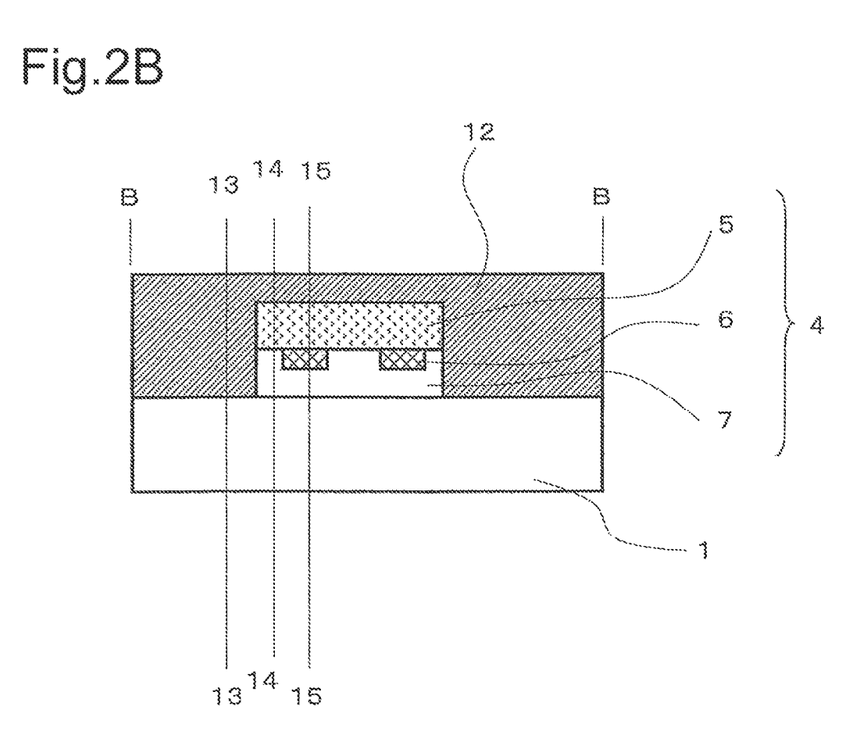
FIG. 2B is a cross-sectional view taken along line B-B in FIG. 1B.

FIG. 1A is a plan view schematically showing the structure of a polycarbonate laminate according to the first embodiment before the lamination process. FIG. 1B is a plan view schematically showing the structure of the polycarbonate laminate according to the first embodiment after the lamination process. FIG. 2A is a cross-sectional view taken along line A-A in FIG. 1A, and FIG. 2B is a cross-sectional view taken along line B-B in FIG. 1B.

FIG. 1A shows a state in which a transfer layer 4 is affixed to a first polycarbonate layer 1. In a plan view of the plane in which the transfer layer 4 extends, the transfer layer 4 includes a first region 2, which is nil of a transparent reflection layer, a second region 3, which is star-shaped and includes a transparent reflection layer. The transfer layer 4 is perceived as having a circular shape. That is, the edge of the transfer layer 4, or the outline of the transfer layer 4, is perceived as having a circular shape.

FIG. 1B shows a polycarbonate laminate 8 including the transfer layer 4. In a plan view of the plane in which the transfer layer 4 extends, the transfer layer 4 includes the first region 2, which is nil of a transparent reflection layer, and the second region 3, which is star-shaped and includes a transparent reflection layer. In a plan view of the plane in which the polycarbonate laminate 8 extends, the entire second region 3 is located inside the outline of the first region 2, that is, the outline of the transfer layer 4.

The polycarbonate laminate 8 shown in FIG. 1B differs from the structure shown in FIG. 1A in that the first region 2 is invisible and only the second region 3 is visible. That is, the oval shape of the transfer layer 4 is no longer visible, and only the star shape is visible. Although the outline of the transfer layer 4 is actually invisible in FIG. 1B, the original circular shape is indicated by the broken line. In the drawings, the interfaces that are actually invisible are indicated by broken lines for illustrative purposes.

As shown in FIG. 2A, the transfer layer 4 is affixed to the upper surface of the first polycarbonate layer 1. The transfer layer 4 includes a peeling protection layer 5, a transparent reflection layer 6, and an adhesion layer 7, which are layered in this order from the top. The transparent reflection layer 6 is formed partially. The surfaces of the transfer layer 4 other than the surface of the adhesion layer 7 in contact with the first polycarbonate layer 1 are exposed to the atmosphere.

That is, the transfer layer 4 is located on a surface of the first polycarbonate layer 1. The transfer layer 4 includes the peeling protection layer 5, the transparent reflection layer 6, and the adhesion layer 7. The adhesion layer 7 is on the surface of the first polycarbonate layer 1, and the adhesion layer 7, the transparent reflection layer 6, and the peeling protection layer 5 are layered in this order away from the surface of the first polycarbonate layer 1. In a plan view of the plane in which the first polycarbonate layer 1 extends, the transparent reflection layer 6 is located only in a part of the peeling protection layer 5.

The transfer layer 4 is affixed to the upper surface of the first polycarbonate layer 1 using a transfer foil having the transfer layer 4. The transfer foil includes a substrate and the transfer layer 4 formed on the surface of the substrate so as to be removable from the surface.

FIG. 2B shows a cross section of the polycarbonate laminate 8, which is formed by overlaying a second polycarbonate layer 12 on the upper sides of the first polycarbonate layer 1 and the transfer layer 4 of the structure shown in FIG. 2A and by performing a lamination process using heat and pressure with the transfer layer 4 enclosed.

The lamination process is the step in which the layered first polycarbonate layer 1, which has the transfer layer 4, and the second polycarbonate layer 12 are laminated together so that the first polycarbonate layer 1, the second polycarbonate layer 12, and the transfer layer 4 are integrated.

The lamination process applies heat and pressure to the first polycarbonate layer 1 and the second polycarbonate layer 12, causing fusion at the interface between the first polycarbonate layer 1 and the second polycarbonate layer 12. The transfer layer 4 is completely enclosed by the first polycarbonate layer 1 and the second polycarbonate layer 12, so that the transfer layer 4 does not have an interface exposed to the atmosphere.

The polycarbonate laminate 8 includes the first polycarbonate layer 1, the second polycarbonate layer 12, and the transfer layer 4. The transfer layer 4 is located on a part of the surface of the first polycarbonate layer 1. The second polycarbonate layer 12 covers the transfer layer 4 and the section of the surface of the first polycarbonate layer 1 that is nil of the transfer layer 4.

The polycarbonate used for the polycarbonate laminate 8 and the structure of the transfer layer 4 are now described.

Polycarbonate

The polycarbonate layer 1 preferably has a thickness of between 50 μm and 500 μm inclusive. When the thickness of the first polycarbonate layer 1 is greater than or equal to 50 μm, the sheet has sufficient physical strength and is easy to handle, reducing potential problems such as creases when an information display layer is formed using printing or other technique. When the thickness of the first polycarbonate layer 1 is less than or equal to 500 μm, any variation in thickness and deformation of the sheet have fewer effects on the processing. More preferably, the transparent sheet has a thickness of between 75 μm and 200 μm inclusive.

The visible light refractive index of the atmosphere is 1, and the visible light refractive index of the polycarbonate is 1.6. The visible light refractive indices of the peeling protection layer 5 and the adhesion layer 7 in the transfer layer 4 are between 1.4 and 1.8 inclusive. Thus, the refractive index difference at the interface of the transfer layer 4 exposed to the atmosphere is greater than or equal to 0.4. This allows the presence of the transfer layer 4 to be visually identified. In other words, the presence of the transfer layer 4 in the area of space for the transfer layer 4 is identifiable.

Generally, it is assumed that an interface is required to have a refractive index difference of greater than or equal to 0.2 to be distinguishable by the human eye. When the refractive index difference at an interface is greater than or equal to 0.2, a person is able to identify the reflection light or scattered light created by the refractive index difference at the interface, that is, the person is able to identify the presence of the interface. In other words, the presence of the interface at the position in space for the interface is identifiable by humans. In contrast, when the refractive index difference is less than or equal to 0.2, a person is unable to identify that there is an interface there. In other words, the presence of the interface at the position in space for the interface is not visually identified.

Peeling Protection Layer

Examples of the material that may be used for the peeling protection layer 5, which is one of the layers of the transfer layer 4, include a material having a visible light refractive index and transparency that are equivalent to those of polycarbonate, as well as having toughness, heat resistance, and molecular weight that are high enough to resist the heat and pressure in the lamination process.

Preferable materials for the peeling protection layer 5 include nitrocellulose (between 1.46 and 1.51 inclusive) having high toughness, melamine (1.6) having a visible light refractive index equivalent to that of polycarbonate, polyarylate (1.61), an epoxy having a thermally stable benzene ring (between 1.5 and 1.61 inclusive), a cycloolefin copolymer (1.53) having a thermally stable cyclic olefin structure.

Other examples of the material for the peeling protection layer 5 include a material that adheres tightly to polycarbonate in a high temperature state during the lamination process, preferably PMMA (between 1.49 and 1.5 inclusive), urethane (1.43), vinyl acetate (1.46), polyethylene (1.53), polypropylene (1.49), and polyester (1.6).

The values in the parentheses following the material names represent the visible light refractive indices of the respective materials. The materials described above are examples of materials for the peeling protection layer 5, and the material for the peeling protection layer 5 is not limited to those materials.

The transparent polymer materials listed above each have a visible light refractive index and transparency that are equivalent to those of polycarbonate, so that the presence of the interface located at its position is not visually identified.

Transparent Reflection Layer

An inorganic compound is an example of the material for the transparent reflection layer 6, which is one of the layers of the transfer layer 4 that is partially formed, in other words, located in a part of the peeling protection layer 5 in a plan view of the plane in which the peeling protection layer 5 extends. Examples of the inorganic compound include ZnS (between 2.3 and 2.4 inclusive) and $TiO_2$ (between 2.5 and 2.7 inclusive). The values in the parentheses following the material names represent the visible light refractive indices of the respective materials. The materials described above are examples of materials for the transparent reflection layer 6, and the material for the transparent reflection layer 6 is not limited to those materials.

The transparent reflection layer shows the image of the back surface of the transfer layer 4 (the side opposite to the observer) through the transparent reflection layer at an angle at which no reflected light or diffracted light is emitted. On the other hand, the transparent reflection layer displays the image formed by the transparent reflection layer at an angle at which reflected light or diffracted light is emitted.

The transfer layer 4 has a visible light refractive index and transparency that are equivalent to those of polycarbonate, so that the transfer layer 4 does not reduce the visibility of the image of the back surface of the transfer layer 4 (the surface opposite to the observer).

Method for Partially Forming Transparent Reflection Layer

The transparent reflection layer 6 is formed on a surface of the peeling protection layer 5. A method for partially forming the transparent reflection layer 6 on the surface of the peeling protection layer 5, that is, the method for forming the transparent reflection layer 6 on a part of the surface of the peeling protection layer 5, may include vapor deposition using a vapor deposition mask. Alternatively, a method for forming the transparent reflection layer 6 may first partially apply a water-soluble ink to the surface of the peeling protection layer 5, form a vapor deposition film on the entire surface of the peeling protection layer 5, and then wash away the ink.

Adhesion Layer

Examples of the material for the adhesion layer 7 of the transfer layer 4 include a material being a visible light refractive index of between 1.4 and 1.8 inclusive. Examples of the material for the adhesion layer 7 include PMMA (between 1.49 and 1.5 inclusive), urethane (1.43), vinyl acetate (1.46), polypropylene (1.49), and polyester (1.6).

The values in the parentheses following the material names represent the visible light refractive indices of the respective materials. The materials described above are examples of materials for the adhesion layer 7, and the material for the adhesion layer 7 is not limited to those materials.

The polycarbonate laminate 8 is formed as described above.

In the structure shown in FIGS. 1A and 2A, that is, the structure in which the transfer layer 4 is not covered by the second polycarbonate layer 12, a part of the transfer layer 4 is exposed to the atmosphere. Thus, the refractive index difference at the interface between the part of the transfer layer, which is a visible light refractive index of between 1.4 and 1.8 inclusive, and the atmosphere, which is a visible light refractive index of 1, is greater than or equal to 0.4. In a visual observation of the transfer layer 4, the first region 2 of the transfer layer 4 is perceivable. In contrast, in the structure shown in FIGS. 1B and 2B, the transfer layer 4 is enclosed by polycarbonate being a visible light refractive index of 1.6, so that the refractive index difference at the interface between the transfer layer 4 and the polycarbonate is less than or equal to 0.2. Accordingly, the interface between the transfer layer 4 and the polycarbonate is not perceivable in a visual observation.

On the other hand, the refractive index difference at the interface between the transparent reflection layer 6, which is a visible light refractive index of greater than or equal to 2.0, and the peeling protection layer 5 and the adhesion layer 7, which are adjacent to the transparent reflection layer 6 and have visible light refractive indices of between 1.4 and 1.8 inclusive, remains the same. Thus, in a visual observation of the polycarbonate laminate 8, the section including the transparent reflection layer 6 is perceivable.

As shown in FIG. 2B, the polycarbonate laminate 8 includes a first cross section 13, a second cross section 14, and a third cross section 15, which are cross sections in the thickness direction of the polycarbonate laminate 8. The first cross section 13 is nil of the transfer layer 4, the second cross section 14 includes the first region 2 of the transfer layer 4, and the third cross section 15 includes the second region 3 of the transfer layer 4.

In particular, the transparent reflection layer 6 is preferably placed on the peeling protection layer 5 such that the first cross section 13 is nonadjacent to the third cross section 15 in the entire transfer layer 4. That is, the cross sections in the thickness direction of the transfer layer 4 preferably do not include a first cross section that is in contact with a third cross section. In other words, in a plan view of the plane in which the transfer layer 4 extends, the entire transparent reflection layer 6 is located inside the outline of the transfer layer 4. This eliminates the need for attention to transfer burrs and chipping that may be generated at the interface of the transfer layer 4 in the transfer process.

Accordingly, the laminate that encloses the transfer layer 4 is significantly easier to manufacture than a conventional structure. In other words, even if transfer burrs and chipping occur when transferring the transfer layer 4, the transfer burrs and chipping at the outline of the transfer layer 4 are not visible in the polycarbonate laminate 8. This increases the yield of the polycarbonate laminate 8.

It is sufficient that at least a part of the transparent reflection layer 6 be located inside the outline of the transfer layer 4 in a plan view of the plane in which the transfer layer 4 extends. In this case, transfer burrs and chipping are less likely to occur in the section of the outline of the transparent reflection layer 6 that is located inside the outline of the transfer layer 4. This eliminates the need for attention to transfer burrs and chipping in the section of the outline of the transparent reflection layer 6 that is located inside the outline of the transfer layer 4.

[Second Embodiment]

Figure 3A:
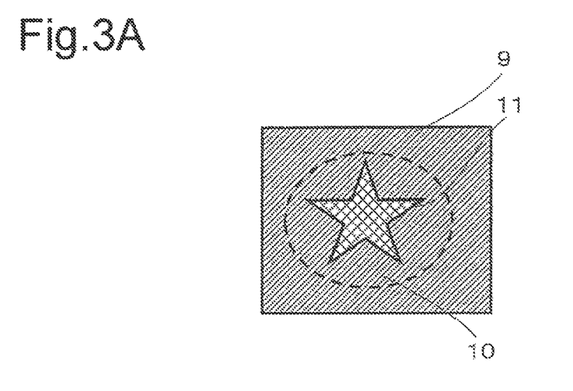
FIG. 3A is a plan view schematically showing the planar structure of a polycarbonate laminate of a second embodiment.
Figure 3B:
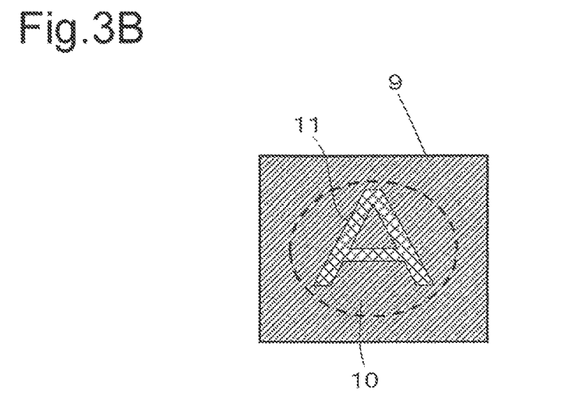
FIG. 3B is a plan view schematically showing the planar structure of a polycarbonate laminate of the second embodiment.
Figure 3C:
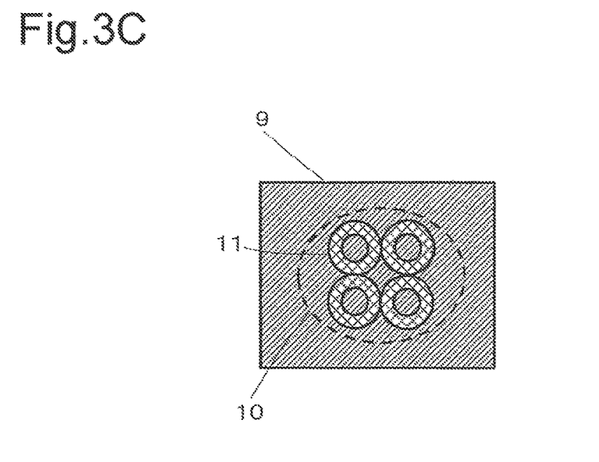
FIG. 3C is a plan view schematically showing the planar structure of a polycarbonate laminate of the second embodiment.

FIGS. 3A to 3C are plan views showing polycarbonate laminates of the second embodiment after the lamination process. FIGS. 3A to 3C each show a first cross section region 9 having the first cross section, a second cross section region 10 having the second cross section, and a third cross section region 11 having the third cross section.

In the polycarbonate laminate 8 shown in FIG. 3A, the third cross section region 11 having the third cross section has the shape of a star in a plan view of the plane in which the polycarbonate laminate 8 extends. In the polycarbonate laminate 8 shown in FIG. 3B, the third cross section region 11 has the shape of the letter A in a plan view of the plane in which the polycarbonate laminate 8 extends. In the polycarbonate laminate 8 shown in FIG. 3C, the third cross section region 11 is of a pattern including multiple toroidal shapes in a plan view of the plane in which the polycarbonate laminate 8 extends. That is, the third cross section region 11 has a pattern formed by four ring-shaped elements in a plan view of the plane in which the polycarbonate laminate 8 extends.

In each of the polycarbonate laminates 8 of the present embodiment, the third cross section region 11 having a certain shape is located inside the transfer layer 4. In addition, the difference between the visible light refractive indices of the layers of the polycarbonate laminate 8 is such that any transfer burrs and chipping at the outline of the transfer layer 4 are unlikely to be visually perceived. The polycarbonate laminate 8 thus allows the transfer layer 4 to easily represent figures, characters, and patterns, more specifically, figures, characters, and patterns having acute or right angles.

In other words, the accuracy of shapes of the outlines of figures, characters, and patterns are improved, as compared with a structure in which figures, characters, and patterns are defined by the outline of the transfer layer 4. Such an accurate shape is difficult to achieve by conventional techniques, which require a transfer foil that has both an adequate transfer quality and an adequate resistance to the thermal pressure in the lamination process.

[Third Embodiment]

Figure 4:
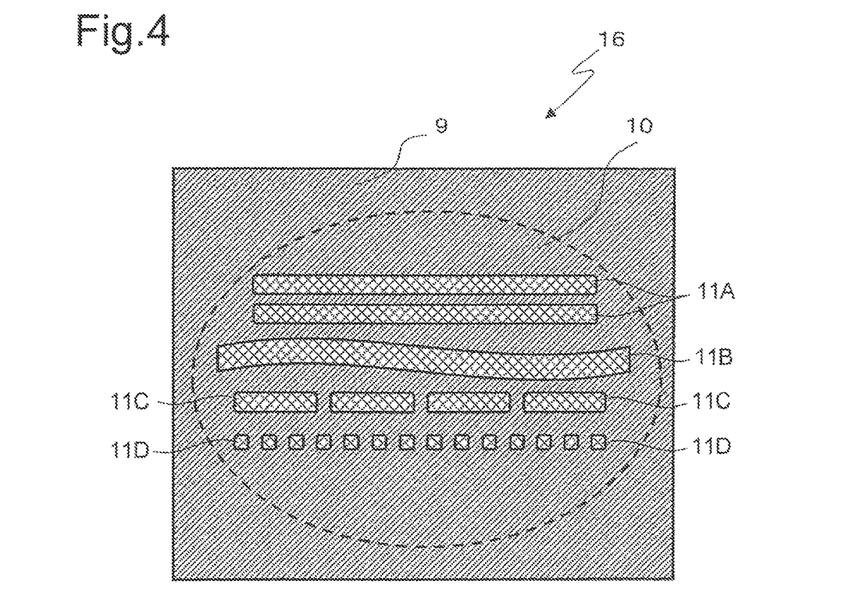
FIG. 4 is a plan view schematically showing the planar structure of a polycarbonate laminate of a third embodiment.

FIG. 4 is a plan view schematically showing a polycarbonate laminate of the third embodiment after the lamination process. The polycarbonate laminate 16 shown in FIG. 4 includes a first cross section region 9 having the first cross section, a second cross section region 10 having the second cross section, and a third cross section region 11 having the third cross section. The third cross section region 11 having the third cross section includes a plurality of third cross section elements.

Of the third cross section elements, two first elements 11A, each having the shape of a bar, are spaced apart from each other by a minute distance, a second element 11B has the shape of a curved line, third elements 11C form the shape of a broken line, and fourth elements 11D form the shape of a dotted line.

More specifically, each first element 11A has the shape of a bar extending in an extension direction, which is a specific direction. The two first elements 11A are spaced apart from each other and arranged in an arrangement direction perpendicular to the extension direction. The distance between the first elements 11A in the arrangement direction is between 1 mm and 50 mm inclusive. The width of the first elements 11A in the arrangement direction is between 0.5 mm and 5 mm inclusive.

The second element 11B has the shape of a curved line extending in the extension direction. The second element 11B has a plurality of bends arranged in the extension direction. The width of the second element 11B in the arrangement direction is between 0.5 mm and 5 mm inclusive, as is the case with the first elements 11A.

The third elements 11C each have the shape of a bar extending in the extension direction. The length of the third element 11C in the extension direction is shorter than the length of a first element 11A in the extension direction. The four third elements 11C are arranged at regular intervals in the extension direction. The distance between the third elements 11C in the extension direction is between 1 mm and 50 mm inclusive. The width of the third elements 11C in the arrangement direction is between 0.5 mm and 5 mm inclusive, as is the case with the first elements 11A.

Each fourth element 11D substantially has the shape of a square. The length of the fourth element 11D in the extension direction is shorter than the length of a third element 11C. The fourth elements 11D are arranged at regular intervals in the extension direction. The distance between the fourth elements 11D in the extension direction is between 1 mm and 50 mm inclusive, as is the case with the third elements 11C. The width of the fourth elements 11D in the arrangement direction is between 0.5 mm and 5 mm inclusive, as is the case with the first elements 11A.

The polycarbonate laminate 16 of the present embodiment allows multiple figures, or elements, to be spaced apart by a minute distance such that the minimum distance between two elements is between 1 mm and 50 mm inclusive. In addition, representation using straight lines, curved lines, broken lines, or dotted lines having a width of between 0.5 mm and 5 mm inclusive is easily achieved. Such shapes are difficult to achieve by conventional techniques, which require a transfer foil that has both an adequate transfer quality and an adequate resistance to the thermal pressure in the lamination process.

When multiple figures, or elements, are spaced apart by a minute distance, the minimum distance between elements is preferably between 1 mm and 50 mm inclusive as described above, and more preferably between 2 mm and 10 mm inclusive. A distance of less than 1 mm will hinder visual perception of the gaps in the transparent reflection layer 6, so that the elements of the transparent reflection layer 6 may be perceived as connected to each other. This reduces the visual effects. If the distance is greater than 50 mm, the figure tends to be equivalent to those achievable with conventional techniques, failing to use the advantage of the polycarbonate laminate 16 of the present embodiment.

The straight lines, curved lines, broken lines, and dotted lines, in other words, elements, preferably have a width of between 0.5 mm and 5 mm inclusive, more preferably between 1 mm and 3 mm inclusive. If the widths of the elements are less than 0.5 mm, the transparent reflection layer is less likely to be visually perceived as having lines. This reduces the visual effects. If the width of the elements is greater than 5 mm, the figure tends to be equivalent to those achievable with conventional techniques, failing to use the advantage of the polycarbonate laminate 16 of the present embodiment.

Figure 5:
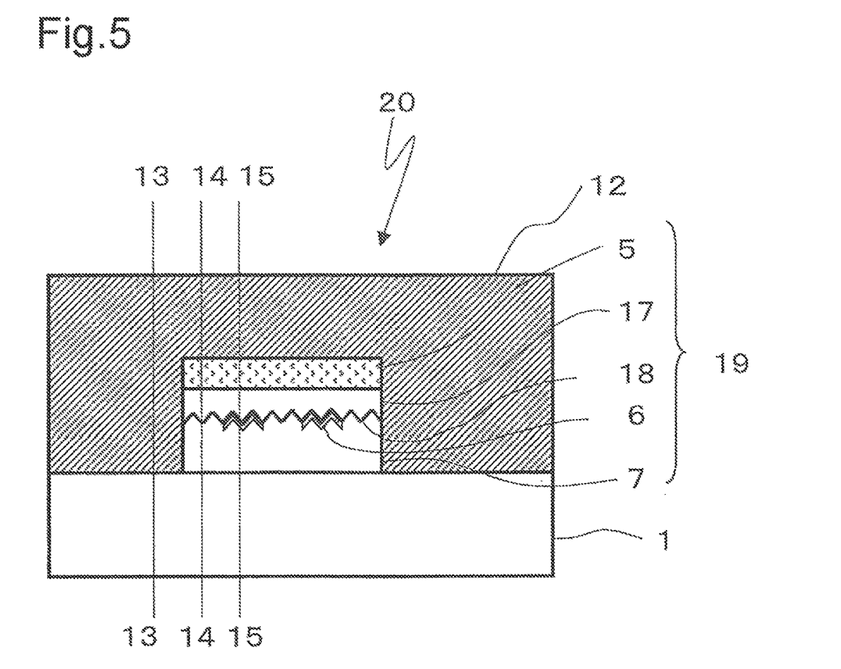
FIG. 5 is a cross-sectional view schematically showing the cross-sectional structure of a polycarbonate laminate of the third embodiment.

FIG. 5 is a cross-sectional view schematically showing the cross-sectional structure of a polycarbonate laminate 20. The polycarbonate laminate 20 differs from the polycarbonate laminate 8 described above referring to FIG. 2B in that the transfer layer 19 includes an optical relief formation layer 17, which has an optical relief structure 18, and that the transparent reflection layer 6, which is formed partially, is in contact with the optical relief structure 18.

Optical Relief Formation Layer

Examples of the material that may be used for the optical relief formation layer 17 include urethane, acrylic, cellulose resin, and ultraviolet curable resin. These resins have visible light refractive indices of between 1.4 and 1.8 inclusive. The materials described above are examples of materials for the optical relief formation layer 17, and the material for the optical relief formation layer 17 is not limited to those materials.

Optical Relief Structure

The optical relief structure 18 of the optical relief formation layer 17 is an uneven shape for generating an optical effect such as diffraction. The optical relief structure 18 may be any of an uneven shape having a function of limiting reflection of the light incident on the optical relief structure 18, an uneven shape having a function of isotropically or anisotropically scattering the light, an uneven shape having a function of a lens for converging or diverging the light, and an uneven shape having a function of selectively reflecting only predetermined polarized light.

As shown in FIG. 5, the transfer layer 19 includes the optical relief structure 18, and the transparent reflection layer 6 is in contact with at least a part of the optical relief structure 18. As long as the transparent reflection layer 6 is located inside the outline of the transfer layer 19, the transparent reflection layer 6 may be located on the entire optical relief structure 18. The transfer layer 19 thus allows the polycarbonate laminate 20 to have optical effects such as optical diffraction, reflection reduction, isotropic or anisotropic scattering, lens effect, and polarization-selective reflection.

As compared with a structure without an optical effect, the polycarbonate laminate 20 with an optical effect has an improved aesthetic appearance and a function of preventing counterfeiting and tampering. The optical relief structure 18 may have an uneven shape that produces one of the optical effects described above, or have an uneven shape that produces a combination of optical effects. Further, the transparent reflection layer 6, which is formed partially, may include a plurality of regions, and the optical relief structure 18 may have uneven shapes that produce a different optical effect for each region.

[Fourth Embodiment]

Figure 6A:
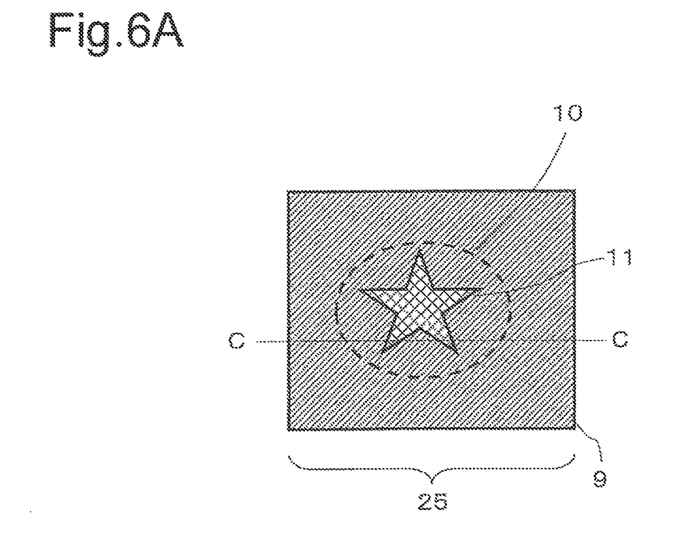
FIG. 6A is a plan view schematically showing the planar structure of a polycarbonate laminate of a fourth embodiment.

FIG. 6A is a plan view showing a state in which a polycarbonate laminate 25 according to the fourth embodiment is not irradiated with excitation light emitted by a light.

Figure 6B:
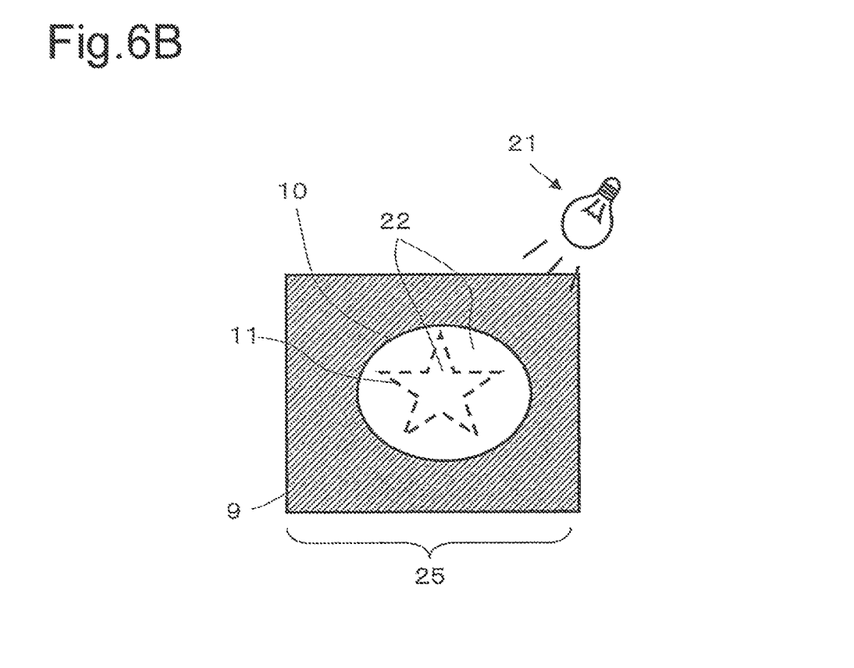
FIG. 6B is a plan view schematically showing the planar structure of the laminate of the fourth embodiment irradiated with excitation light using a light.

FIG. 6B is a plan view showing a state in which the polycarbonate laminate 25 is irradiated with excitation light emitted by a light.

FIG. 6A shows that the polycarbonate laminate 25 includes a first cross section region 9 having the first cross section, a second cross section region 10 having the second cross section, and a third cross section region 11 having the third cross section. FIG. 6B shows that a light 21 directs excitation light such as ultraviolet light to the polycarbonate laminate 25. When irradiated with excitation light, the second cross section region 10 and the third cross section region 11 of the polycarbonate laminate 25 are perceived as emitting light, that is, as having luminescent regions 22.

Figure 7:
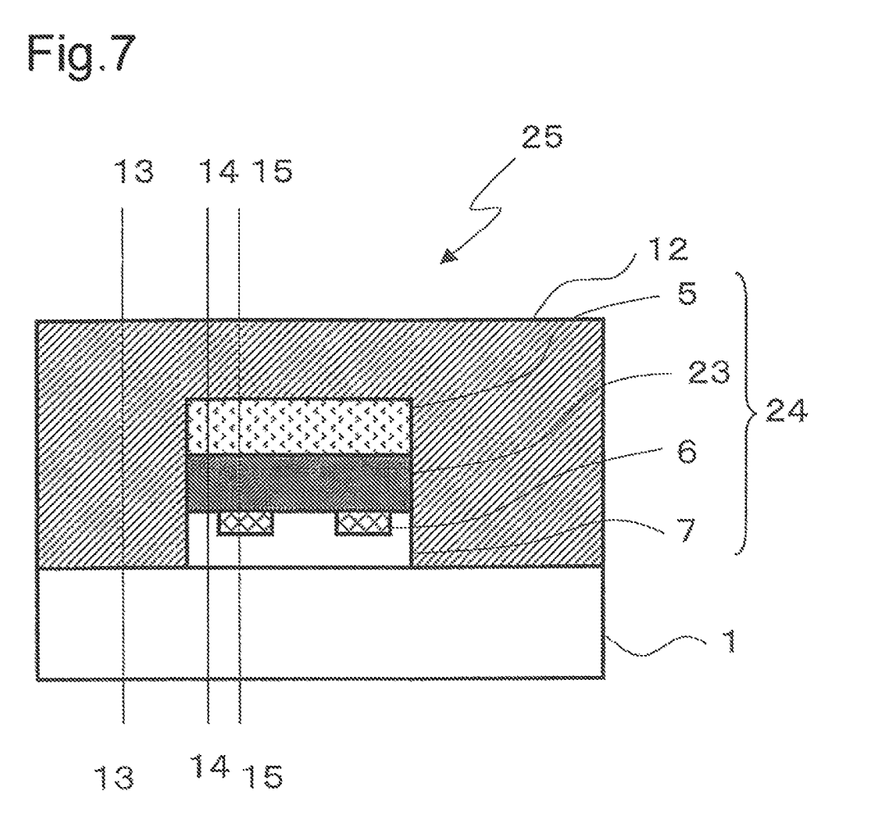
FIG. 7 is a cross-sectional view taken along line C-C in FIG. 6A.

FIG. 7 is a cross-sectional view taken along line C-C in FIG. 6A. The polycarbonate laminate 25 differs from the polycarbonate laminate 8 described above referring to FIG. 2B in that the transfer layer 24 includes a luminescent material layer 23.

The transfer layer 24 of the polycarbonate laminate 25 includes a peeling protection layer 5, the luminescent material layer 23, a transparent reflection layer 6, and an adhesion layer 7. The luminescent material layer 23 is located on an entire surface of the peeling protection layer 5, and the transparent reflection layer 6 is located on a part of the surface of the luminescent material layer 23 opposite to the surface in contact with the peeling protection layer 5. The adhesion layer 7 covers the transparent reflection layer 6 and the section of the luminescent material layer 23 that is nil of the transparent reflection layer 6.

Luminescent Material Layer

The luminescent material layer is described here. The luminescent material layer includes a luminescent material that absorbs excitation light such as ultraviolet light and has the maximum emission wavelength in a visible light region that is different from the region of the peak wavelength of the excitation light. Examples of the material for the luminescent material include diaminostilbene disulfonic acid derivatives, imidazole derivatives, coumarin derivatives, derivatives such as triazole, carbazole, pyridine, naphthalic acid, and imidazolone, dyes such as fluorescein and eosin, and an organic compound having benzene rings such as anthracene.

More specifically, examples of the luminescent material includes EB-501 (manufactured by Mitsui Chemicals, Inc., luminescent color: blue), EG-302 (manufactured by Mitsui Chemicals, Inc., luminescent color: lime green), EG-307 (manufactured by Mitsui Chemicals, Inc., luminescent color: green), ER-120 (manufactured by Mitsui Chemicals, Inc., luminescent color: red), and ER-122 (manufactured by Mitsui Chemicals, Inc., luminescent color: red).

The luminescent material may be an inorganic material. Examples of the inorganic material include a pigment obtained by adding a metal element such Mn, Zn, Ag, Cu, Sb, and Pb or a rare-earth element such as a lanthanoid as an activator to the main component of crystal such as oxides, sulfides, silicates, phosphates, and tungstates of Ca, Ba, Mg, Zn and Cd and by firing the mixture. More specifically, the inorganic material may be ZnO:Zn, Br(PO)Cl:Eu, ZnGcO:Mn, YO:Eu, Y(P,V)O:Bu, YOSi:Eu, and ZnGcO:Mn.

As described above referring to FIG. 7, the transfer layer 24 may include the luminescent material layer 23. In addition, the peeling protection layer 5 or the adhesion layer 7 of the transfer layer 24 may include a luminescent material. Accordingly, the polycarbonate laminate 25 has the luminescent region 22, and the light emitted by the luminescent region 22 displays a predetermined shape.

By irradiating the luminescent material layer 23, or the peeling protection layer 5 or the adhesion layer 7 that has a luminescent material with excitation light to check whether the layer emits light, an imitation that is indistinguishable from a genuine product at a glance is accurately identified. In other words, the luminescent region of the transfer layer 24 allows for authentication of the polycarbonate laminate 25. Thus, even if an imitated polycarbonate laminate is indistinguishable from the genuine polycarbonate laminate 25 at a glance, excitation light irradiation will accurately indicate whether the laminate is genuine or an imitation. In addition, the luminescent region further improves the aesthetic appearance of the polycarbonate laminate 25.

[Fifth Embodiment]

Figure 8A:
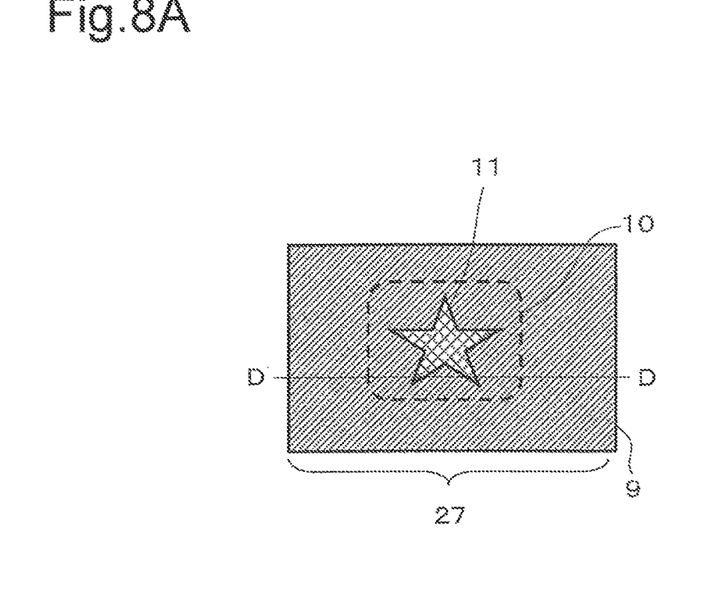
FIG. 8A is a plan view schematically showing the planar structure of a polycarbonate laminate of a fifth embodiment.
Figure 8B:
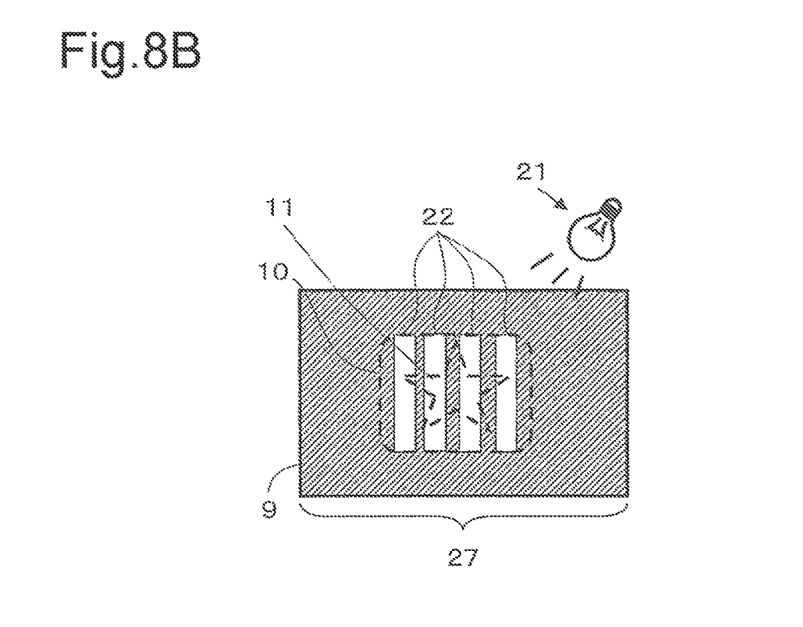
FIG. 8B is a plan view schematically showing the planar structure of the laminate of the fifth embodiment irradiated with excitation light using a light.

FIG. 8A is a plan view showing a state in which a polycarbonate laminate 27 according to the fifth embodiment is not irradiated with excitation light emitted by a light. FIG. 8B is a plan view showing a state in which the polycarbonate laminate 27 is irradiated with excitation light emitted by a light.

The polycarbonate laminate 27 differs from the polycarbonate laminate 25 described above referring to FIGS. 6A and 6B in that the luminescent region 22, which emits light when irradiated with excitation light, is located partially in the second cross section region 10 and the third cross section region 11, instead of in the entire regions.

The luminescent region 22 has a shape representing a pattern, specifically, a vertical stripe pattern, which differs from the star shape of the third cross section region 11. The luminescent region 22 includes a plurality of luminescent elements, each having the shape of a straight line extending in a specific direction. The luminescent elements are arranged and spaced apart from each other in a direction perpendicular to the specific direction.

In other words, the luminescent region 22 is shaped differently from the second region 3, in which the transparent reflection layer is located. Further, since the transparent reflection layer is used, a pattern that differs from that of the transparent reflection layer is identified when the luminescent region 22 is irradiated with excitation light and emits light. The luminescent region 22 may form a pattern representing country codes, individual numbers, characters such as alphabet letters, codes, and, in particular, identification information.

Further, a security pattern such as a geometric guilloche pattern may be formed.

Figure 9:
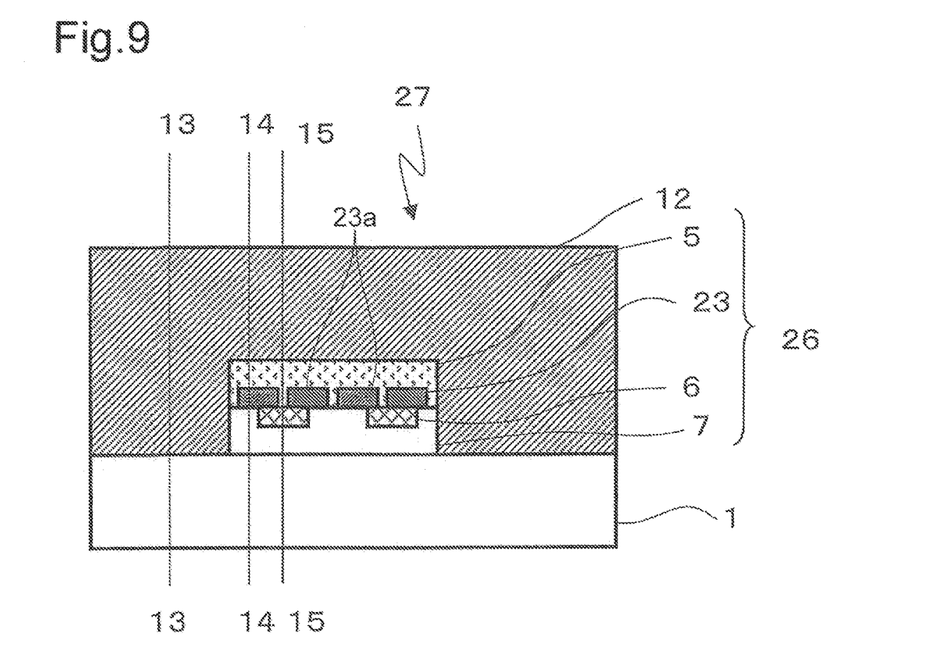
FIG. 9 is a cross-sectional view taken along line D-D in FIG. 8A.

FIG. 9 is a cross-sectional view taken along line D-D in FIG. 8A. The polycarbonate laminate 27 differs from the polycarbonate laminate 25 described above referring to FIG. 7 in that the transfer layer 26 has a luminescent material layer 23 that is formed partially.

That is, the transfer layer 26 includes a peeling protection layer 5, the luminescent material layer 23, a transparent reflection layer 6, and an adhesion layer 7. The luminescent material layer 23 includes a plurality of luminescent elements 23a. The luminescent elements 23a extend in a specific direction and are arranged at regular intervals in a direction perpendicular to the specific direction.

The luminescent material layer 23 is located partially in the transfer layer 26 in a plan view of the plane in which the transfer layer 26 extends. Thus, the shape displayed by the light emitted from the luminescent material layer 23, which is a vertical stripe pattern, differs from the shape of the transparent reflection layer 6, which is a star shape. The polycarbonate laminate 27 therefore has an aesthetic appearance and a function of preventing counterfeiting and tampering.

[Sixth Embodiment]

Figure 10:
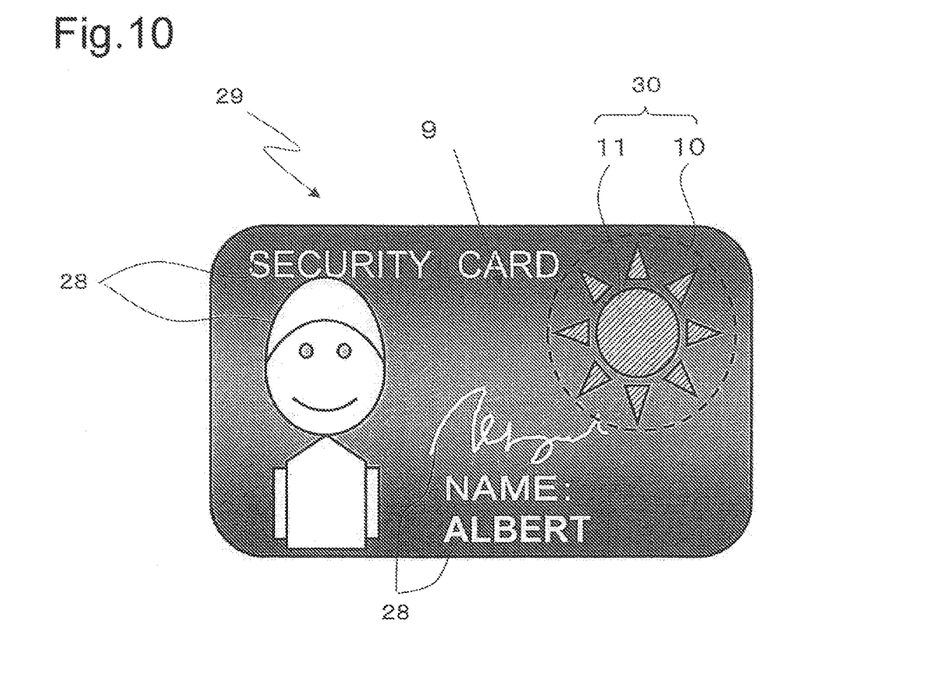
FIG. 10 is a plan view schematically showing the planar structure of an identification medium of a sixth embodiment.

FIG. 10 is a plan view schematically showing the planar structure of an identification medium of the sixth embodiment of a polycarbonate laminate. An identification medium 29 is a card-shaped identification medium enclosing a transfer layer 30. The identification medium 29 includes a picture of the holder of the identification medium 29 and textual information, which are formed by printing 28. The identification medium 29 has a first cross section region 9, a second cross section region 10, and a third cross section region 11.

In the identification medium 29, the first cross section region 9 is nonadjacent to the third cross section region 11. The third cross section region 11 has a shape representing the sun. The third cross section region 11 includes a circular first element and a plurality of second elements each having a triangular shape. The second elements are arranged in the circumferential direction of the first element on the outer side of the first element. Each second element of the third cross section region 11 has an acute angle.

The identification medium 29, which may be a card formed by the polycarbonate laminate, is easier to make than a conventional medium and also has a novel aesthetic appearance and an improved function of preventing counterfeiting and tampering.

The printing 28 may overlap with the transfer layer 4 and the transparent reflection layer. This does not reduce the visibility of the print layer including the printing 28, and any tampering of the print layer will damage the transfer layer 4, allowing for detection of the tampering.

Individual information and other information may be formed by a laser in a similar manner as the printing 28. The printing formed by a laser may overlap with the transfer layer 4 and the transparent reflection layer. This does not reduce the visibility of the laser printing, and any tampering of the laser printing will damage the transfer layer 4, allowing for detection of the tampering, as is the case with the printing 28.

The printing 28 and the laser printing may be formed on the back surface of the transfer layer (the surface opposite to the observer). This structure further increases the difficulty of tampering.

EXAMPLE

A specific example is now described in detail. In the following examples, "parts" represents parts by mass, and "ratio" represents mass ratio.

A polycarbonate laminate 8 having the structure described above referring to FIGS. 1A, 1B, 2A and 2B was fabricated. First, a PET film having a thickness of 25 μm was prepared as a transfer-foil holding sheet, which is an example of a substrate. Using the gravure printing technique, an ink for peeling protection layer was applied to the transfer-foil holding sheet so as to have a thickness of 1 μm. A transparent reflection layer 6 was formed partially on the peeling protection layer 5 through vacuum vapor deposition using a vapor deposition mask. Then, an ink for adhesion layer was applied to the peeling protection layer 5 and the transparent reflection layer 6 through the gravure printing technique so as to have a thickness of 4 μm. The transfer foil of the example was thus obtained.

<Transfer-Foil Holding Sheet>
PET film (Lumirror (registered trademark), manufactured by Toray Industries, Inc.)

<Ink for Peeling Protection Layer>
Polyarylate resin (Tg: 220° C., refractive index: 1.61, tensile elastic modulus: 1900 MPa): 12 parts
Polyethylene wax: 0.1 parts
Cyclohexanone: 40 parts
Toluene: 50 parts <Transparent Reflection Layer 6>
Sulfur sulfide (ZnS), thickness 500 Å (0.05 pm)

<Ink for Adhesion Layer>
Polyester resin: 20 parts
Methyl ethyl ketone: 40 parts
Toluene: 50 parts A part of the transfer foil was transferred to a first polycarbonate layer 1 using a hot stamping transfer machine. As the transfer conditions, the transfer temperature was set to 120° C. and the transfer time was set to 1 second. As the first polycarbonate layer 1, a polycarbonate sheet (Makrofol (registered trademark) ID6-2, manufactured by Bayer AG) having a thickness of 100 μm was used.

The transfer layer 4 transferred to the first polycarbonate layer 1 was held between and enclosed by the first polycarbonate layer 1 and the second polycarbonate layer 12, and the first polycarbonate layer 1, the second polycarbonate layer 12, and the transfer layer 4 were laminated together. As the second polycarbonate layer 12, a polycarbonate sheet (Makrofol ID6-2, manufactured by Bayer AG) having a thickness of 100 μm was used. As the lamination conditions, the temperature was set to 200° C., the pressure was set to 80 N/cm², and the time was set to 25 minutes.

The polycarbonate laminate 8 was thus obtained. When the polycarbonate laminate 8 was observed from the side corresponding to the surface of the second polycarbonate layer 12, the star shape of the transparent reflection layer 6 was perceived, but the outline of the transfer layer 4, which had a horizontal oval shape, was not perceived.

Since the polyarylate resin having a high melting point and high rigidity was used for the peeling protection layer 5 of the transfer layer 4, the temperature and pressure during the lamination process did not damage the transfer layer 4. In addition, the transferring of the transfer layer 4 generated a number of transfer burrs in the transfer layer 4, so that the transfer layer 4 had a shape significantly different from the horizontal oval shape. However, no transfer burr was perceived after the lamination process of the first polycarbonate layer 1 and the second polycarbonate layer 12.

INDUSTRIAL APPLICABILITY

The polycarbonate laminate enclosing the transfer layer is applicable to an identification medium and an information recording medium, such as a card and a passport.

DESCRIPTION OF THE REFERENCE NUMERALS

1 . . . First polycarbonate layer
2 . . . First region
3 . . . Second region
4, 19, 24, 26, 30 . . . Transfer layer
5 . . . Peeling protection layer
6 . . . Transparent reflection layer
7 . . . Adhesion layer
8, 16, 20, 25, 27 . . . Polycarbonate laminate
9 . . . First cross section region
10 . . . Second cross section region
11 . . . Third cross section region
11A . . . First element
11B . . . Second element 11C ... Third element
11D ... Fourth element
12 ... Second polycarbonate layer
13 ... First cross section
14 ... Second cross section
15 ... Third cross section
17 ... Optical relief formation layer
18 ... Optical relief structure
21 ... Light
22 ... luminescent region
23 ... Luminescent material layer
23a ... Luminescent element
28 ... Printing
29 ... Identification medium

The invention claimed is:

1. A method for manufacturing a laminate, the method comprising:
transferring a transfer layer onto a first polycarbonate layer, wherein
the transfer layer includes a plurality of layers including a transparent reflection layer,
the transparent reflection layer has a visible light refractive index of greater than or equal to 2.0, and
in a plan view of a plane in which the transfer layer extends, the transparent reflection layer is located in a part of the transfer layer and at least a part of the transparent reflection layer is located inside an outline of the transfer layer, and a portion of the transfer layer that is nil of the transparent reflection layer has a visible light refractive index of between 1.4 and 1.8 inclusive; and
laminating the first polycarbonate layer and a second polycarbonate layer with the transfer layer together such that the transfer layer is held between and enclosed by the first and second polycarbonate layers.

2. A laminate comprising:
a transfer layer having a plurality of layers including a transparent reflection layer, wherein
the transparent reflection layer has a visible light refractive index of greater than or equal to 2.0,
in a plan view of a plane in which the transfer layer extends, the transparent reflection layer is located in a part of the transfer layer,
at least a part of the transparent reflection layer is located inside an outline of the transfer layer, and
a portion of the transfer layer that is nil of the transparent reflection layer has a visible light refractive index of between 1.4 and 1.8 inclusive; and
a polycarbonate layer enclosing the transfer layer,
wherein a cross section in a thickness direction of the laminate includes
a first cross section that is nil of the transfer layer,
a second cross section including the portion of the transfer layer that is nil of the transparent reflection layer, and
a third cross section including a portion of the transfer layer that includes the transparent reflection layer.

3. The laminate according to claim 2, wherein the first cross section is nonadjacent to the third cross section.

4. The laminate according to claim 2 or 3, wherein, in a plan view of the plane in which the transfer layer extends, a region having the third cross section has a shape that represents at least one of a figure, a character, and a pattern.

5. The laminate according to claim 4, wherein, in a plan view of the plane in which the transfer layer extends, the region having the third cross section has at least one of an acute angle and a right angle.

6. The laminate according to claim 2, wherein
the transfer layer has a plurality of regions having the transparent reflection layer, and
a minimum distance between at least two of the regions having the transparent reflection layer is between 1 mm and 50 mm inclusive.

7. The laminate according to claim 2, wherein, in a plan view of the plane in which the transfer layer extends, a region having the third cross section has a width of between 0.5 mm and 5 mm inclusive and a shape of at least one of a straight line, a curved line, and a dotted line.

8. The laminate according to claim 2, wherein
the transfer layer includes an optical relief formation layer having an optical relief structure, and
the transparent reflection layer is in contact with at least a part of the optical relief structure.

9. The laminate according to claim 2, wherein at least one of the layers of the transfer layer includes a luminescent material having a maximum emission wavelength in a wavelength region that differs from a wavelength region of a peak wavelength of excitation light.

10. The laminate according to claim 9, wherein, in a plan view of the plane in which the transfer layer extends, the luminescent material is located in a part of the transfer layer and the luminescent material has a shape that differs from a shape of the transparent reflection layer.

11. An identification medium comprising:
the laminate according to claim 2, and
an individual information formed by laser.

* * * * *